US008136761B2

(12) United States Patent
Kiyosawa

(10) Patent No.: US 8,136,761 B2
(45) Date of Patent: Mar. 20, 2012

(54) SELF-PROPELLED WHEEL APPARATUS OF AIRCRAFT

(75) Inventor: Yoshihide Kiyosawa, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 370 days.

(21) Appl. No.: 12/536,614

(22) Filed: Aug. 6, 2009

(65) Prior Publication Data
US 2010/0065678 A1 Mar. 18, 2010

(30) Foreign Application Priority Data
Sep. 12, 2008 (JP) .................................. 2008-235345

(51) Int. Cl.
*B64C 25/34* (2006.01)
(52) U.S. Cl. ...................................... 244/103 R; 244/50
(58) Field of Classification Search .................... 244/50, 244/103 R
See application file for complete search history.

(56) References Cited

U.S. PATENT DOCUMENTS
3,711,043 A * 1/1973 Cameron-Johnson .......... 244/50
3,762,670 A * 10/1973 Chillson ......................... 244/50

FOREIGN PATENT DOCUMENTS
JP 5-193577 A 8/1993
JP 2007-112408 A 5/2007

OTHER PUBLICATIONS

"NTN Develops Compact, Light-Weight Torque Diode". Anonymous. Apr. 17, 2006. Retrieved Oct. 1, 2011 from http://www.ntn.co.jp/english/news/news_files/new_products/news20060411.html.*
Lauletta, Anthony. "The Basics of Harmonic Drive Gearing." Gear Product News, Apr. 2006, pp. 32-36. Retrieved Oct. 1, 2011 from http://www.gearproductnews.com/issues/0406/gpn.pdf.*
"Lunar Roving Vehicle." Boeing Press. 1972.*
Ueura, K. & Slatter, R. "Actuators: Development of the harmonic drive gear for space applications." Space Mechanisms and Tribology, Proceedings of the 8th European Symposium, held Sep. 29-Oct. 1, 1999 in Toulouse, France. Edited by D. Danesy. European Space Agency, ESA-SP, vol. 438, 1999., pp. 259-264.*

* cited by examiner

*Primary Examiner* — Tien Dinh
*Assistant Examiner* — Michael Kreiner
(74) *Attorney, Agent, or Firm* — Buchanan Ingersoll & Rooney PC

(57) ABSTRACT

In a self-propelled wheel apparatus of an aircraft, a drive mechanism composed of a wave gear drive and a motor is coaxially linked to an axle of a wheel via a one-way clutch, and rotational force in the reverse direction of the aircraft is transmitted to the wheel axle via the one-way clutch. When the aircraft moves forward, the link between the wheel axle and an output shaft of the wave gear drive is cut off by the one-way clutch, and motor rotational force is transmitted to the wheel axle, causing the wheel to rotate, only when the aircraft moves backward.

1 Claim, 1 Drawing Sheet

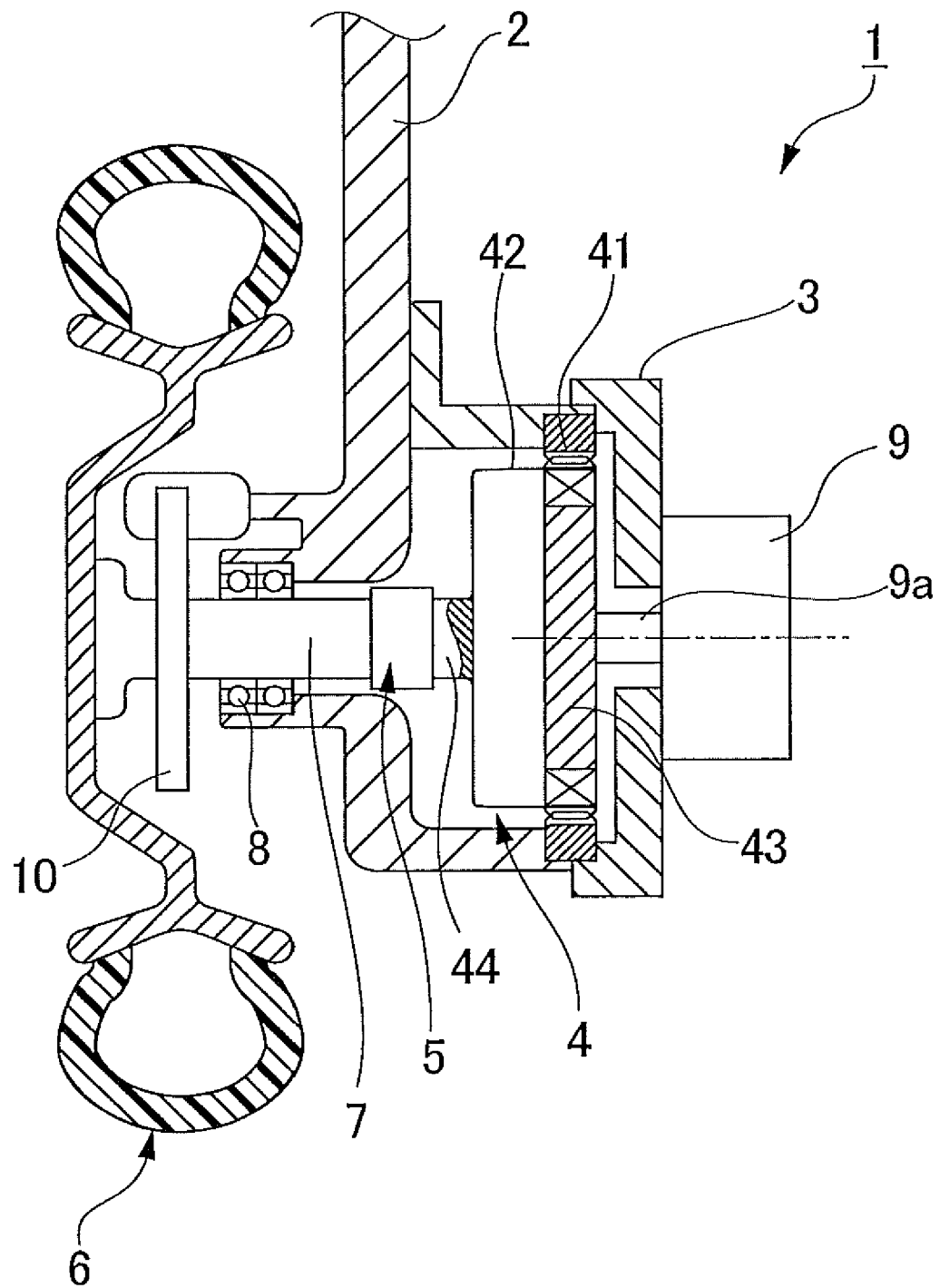

SELF-PROPELLED WHEEL APPARATUS OF AIRCRAFT

BACKGROUND OF THE INVENTION

1. Field of the Invention

The present invention relates to a self-propelled wheel apparatus of an aircraft.

2. Description of the Related Art

Aircraft wheels commonly have a brake function but do not have a self-propulsion function, and a towing vehicle is therefore used when an aircraft travels backward on land.

Aircraft wheels comprising self-propulsion mechanisms are disclosed in JP-A 05-193577 and JP-A 2007-112408. The aircraft wheel disclosed in JP-A 05-193577 is configured so that the power of a power source for on-land travel is transmitted to a wheel axle via a clutch and a transmission mechanism composed of a bevel gear. The aircraft wheel disclosed in JP-A 2007-112408 is configured so that rotation derived from a motor via a reducer is transmitted directly to a wheel axle.

SUMMARY OF THE INVENTION

An object of the present invention is to provide a self-propelled wheel apparatus of an aircraft comprising a small-sized and compact drive mechanism.

In order to achieve the above and other objects, a self-propelled wheel apparatus of an aircraft according to the present invention, comprises:

a motor;

a wave gear drive for reducing in speed of an output rotation of the motor;

an aircraft wheel that is driven by an reduced-speed rotational force exerted from the wave gear drive; and a one-way clutch for transmitting only the reduced-speed rotational force in a reverse direction of the aircraft from the wave gear drive to the aircraft wheel.

It is preferable that the motor, the wave gear drive, the one-way clutch and an axle of the aircraft wheel are arranged coaxially in this order.

The wave gear drive may be of the cup type, which has an annular rigid internally toothed gear fixed to an internal peripheral surface of an apparatus housing, a cup-shaped flexible externally toothed gear disposed coaxially on an internal side of the internally toothed gear, and a wave generator having an elliptical outline fitted coaxially into an internal side of the externally toothed gear. In this case, an output shaft of the motor is coaxially linked and fixed to the wave generator, and an output shaft formed in a center of a cup bottom portion of the flexible externally toothed gear is coaxially linked to the wheel axle via the one-way clutch.

BRIEF DESCRIPTION OF THE DRAWINGS

FIG. 1 is a schematic structural diagram depicting a self-propelled wheel apparatus of an aircraft in which the present invention is applied.

DETAILED DESCRIPTION OF A PREFERRED EMBODIMENT

FIG. 1 is a schematic structural diagram showing a self-propelled wheel apparatus of an aircraft according to the present invention. A plurality of front, rear, left, and right self-propelled wheel apparatuses are attached on the underside of the aircraft fuselage so as to be able to be extended from and be retracted into the fuselage. One of these self-propelled wheel apparatuses is shown in FIG. 1.

Described with reference to this diagram, a self-propelled wheel apparatus 1 comprises a cylindrical apparatus housing 3 attached in a sideways state to the bottom end of a supporting leg 2 attached to the fuselage of the aircraft (not shown). A wave gear drive 4 and a one-way clutch 5 are coaxially built into the interior of the apparatus housing 3. A wheel 6 is disposed on the external side of the apparatus housing 3, and an axle 7 of the wheel 6 extends from the open end of the apparatus housing 3 into the apparatus housing in a coaxial state. The wheel axle 7 is rotatably supported by the apparatus housing 3 and the supporting leg 2 via a bearing 8 attached in the open end of the apparatus housing 3. A motor 9 is coaxially attached to the inside end surface of the apparatus housing 3, and a rotating shaft 9a of the motor is coaxially linked to the wave gear drive 4 inside the apparatus housing 3.

The wave gear drive 4 may, for example, be a cup-shaped gear drive, and the wave gear drive 4 comprises an annular rigid internally toothed gear 41 fixed to the internal peripheral surface of the apparatus housing 3, a cup-shaped flexible externally toothed gear 42 disposed coaxially on the internal side of the internally toothed gear, and a wave generator 43 having an elliptical outline, for example, fitted coaxially into the internal side of the externally toothed gear. The rotating shaft 9a of the motor 9 is coaxially linked and fixed to the wave generator 43. An output shaft 44 formed in the center of the cup bottom surface portion of the flexible externally toothed gear 42 is coaxially linked to the wheel axle 7 via the one-way clutch 5. A brake mechanism, e.g., a disc brake 10, is attached to the wheel axle 7.

An electric motor, a hydraulic motor, or another motor can be used for the motor 9. A mechanical clutch or a hydraulic, pneumatic, or other type of fluid pressure clutch can be used for the one-way clutch 5. For example, a friction clutch or a clutch with a ratchet mechanism can be used. The one-way clutch 5 transmits rotational force for rotating the wheel 6 in a direction that moves the aircraft backward, and does not transmit rotational force in the opposite direction. A torque diode (product name: made by NTN Corporation) can also be used.

In the self-propelled wheel apparatus 1 of an aircraft having this configuration, a drive mechanism composed of the wave gear drive 4 and the motor 9 is coaxially linked to the axle 7 of the wheel 6 via the one-way clutch 5, and rotational force in the reverse direction of the aircraft is transmitted to the wheel axle 7. When the aircraft moves forward, the link between the wheel axle 7 and the output shaft 44 of the wave gear drive 4 is cut off by the one-way clutch 5, and motor rotational force is transmitted to the wheel axle 7, causing the wheel 6 to rotate, only when the aircraft moves backward.

According to the self-propelled wheel apparatus 1 of an aircraft of the present invention, since a wave gear drive having a small number of components and a high reduction ratio is used, the self-propelled wheel apparatus for moving the aircraft backward can be made smaller in size and more compact.

What is claimed is:

1. A self-propelled wheel apparatus of an aircraft, comprising:

a motor;

a wave gear drive for reducing speed of an output rotation of the motor;

an aircraft wheel that is driven by the reduced-speed output rotation exerted from the wave gear drive; and a one-way clutch for transmitting only the reduced-speed output rotation in a reverse direction of the aircraft from the wave gear drive to the aircraft wheel, wherein the motor, the wave gear drive, the one-way clutch and an axle of the aircraft wheel are arranged coaxially in this order along an axial direction thereof, wherein the wave gear drive has an annular rigid internally toothed gear fixed to an internal peripheral surface of an apparatus housing, a cup-shaped flexible externally toothed gear disposed coaxially on an internal side of the internally toothed gear, and a wave generator having an elliptical outline fitted coaxially into an internal side of the externally toothed gear, and an output shaft of the motor is coaxially linked and fixed to the wave generator, and an output shaft formed in a center of a cup bottom portion of the flexible externally toothed gear is coaxially linked to the wheel axle via the one-way clutch.

* * * * *